United States Patent
Gomez

(10) Patent No.: US 9,766,117 B2
(45) Date of Patent: Sep. 19, 2017

(54) INTERACTIVE SCALE WITH PROXIMITY DETECTOR

(71) Applicant: Hector Manuel Garzon Gomez, Katy, TX (US)

(72) Inventor: Hector Manuel Garzon Gomez, Katy, TX (US)

(73) Assignee: UNIVERSITY OF HOUSTON, Houston, TX (US)

( * ) Notice: Subject to any disclaimer, the term of this patent is extended or adjusted under 35 U.S.C. 154(b) by 141 days.

(21) Appl. No.: 14/270,863

(22) Filed: May 6, 2014

(65) Prior Publication Data

US 2014/0326517 A1 Nov. 6, 2014

Related U.S. Application Data

(60) Provisional application No. 61/819,880, filed on May 6, 2013.

(51) Int. Cl.
| | |
|---|---|
| *G01G 19/50* | (2006.01) |
| *G01G 23/18* | (2006.01) |
| *G01G 19/44* | (2006.01) |

(52) U.S. Cl.
CPC ............ *G01G 19/50* (2013.01); *G01G 19/44* (2013.01); *G01G 23/18* (2013.01)

(58) Field of Classification Search
CPC .......... G01G 19/44; G01G 19/50; G01G 23/18
See application file for complete search history.

(56) References Cited

U.S. PATENT DOCUMENTS

| | | | | |
|---|---|---|---|---|
| 5,832,417 | A * | 11/1998 | Petrucelli | G01G 23/01 |
| | | | | 177/25.13 |
| 6,617,530 | B1 | 9/2003 | Lin | |
| 6,974,075 | B1* | 12/2005 | Duke | A61B 5/02405 |
| | | | | 235/375 |
| 8,131,498 | B1* | 3/2012 | McCauley | A61B 5/1036 |
| | | | | 177/144 |
| 8,200,453 | B2* | 6/2012 | Gage | G06F 19/3475 |
| | | | | 177/1 |
| 8,475,367 | B1* | 7/2013 | Yuen | G06F 19/3418 |
| | | | | 128/920 |
| 2003/0121974 | A1* | 7/2003 | Blanford | G01G 19/4144 |
| | | | | 235/383 |
| 2004/0211599 | A1* | 10/2004 | Kasinoff | G01G 19/4144 |
| | | | | 177/25.15 |
| 2004/0229575 | A1 | 11/2004 | Chan et al. | |
| 2004/0238228 | A1* | 12/2004 | Montague | G01G 19/44 |
| | | | | 177/25.13 |
| 2005/0113650 | A1 | 5/2005 | Pacione et al. | |
| 2008/0028122 | A1 | 1/2008 | Park | |

(Continued)

FOREIGN PATENT DOCUMENTS

DE 202008008194 U1 8/2008

*Primary Examiner* — Natalie Huls
(74) *Attorney, Agent, or Firm* — Winstead PC

(57) ABSTRACT

An interactive scale may provide a display, load cells, proximity sensor, light sensor, microcontroller, wireless transceiver, audio indicator(s) and/or visual indicator(s). The interactive scale may provide a variety of features, including proximity detection, detection of lighting conditions, wireless data communication, data tracking, and visual/audio indicator(s) that aid in utilizing the scale.

21 Claims, 3 Drawing Sheets

(56) References Cited

U.S. PATENT DOCUMENTS

| | | | | |
|---|---|---|---|---|
| 2009/0076842 | A1* | 3/2009 | Schwarzberg | G06F 19/345 705/2 |
| 2009/0118589 | A1* | 5/2009 | Ueshima | G01D 9/005 600/300 |
| 2009/0278696 | A1* | 11/2009 | Lindh | A61B 5/0002 340/573.1 |
| 2012/0111645 | A1* | 5/2012 | Lindner | G01G 19/50 177/177 |
| 2012/0111647 | A1* | 5/2012 | Lindner | G01G 19/50 177/238 |
| 2012/0122430 | A1* | 5/2012 | Hutchings | G01G 19/44 455/414.1 |
| 2012/0330683 | A1* | 12/2012 | Ledwidge | A61B 5/0002 705/3 |
| 2013/0341104 | A1* | 12/2013 | Suzuki | G01G 19/44 177/50 |
| 2014/0083779 | A1* | 3/2014 | Sharma | G01G 19/44 177/1 |
| 2014/0142396 | A1* | 5/2014 | Ricks | A61B 5/0537 600/301 |
| 2015/0220706 | A1* | 8/2015 | Lin | G06Q 50/22 705/2 |

\* cited by examiner

INTERACTIVE SCALE WITH PROXIMITY DETECTOR

RELATED APPLICATIONS

This application claims the benefit of U.S. Provisional Patent Application No. 61/819,880 to Hector Manuel Garzon Gomez, filed on May 6, 2013, which is incorporated herein by reference.

FIELD OF THE INVENTION

This invention relates to a scale, and more particularly, to an improved interactive scale.

BACKGROUND OF INVENTION

Current weight scales are basic and provide limited functionality for users. For example, many scales are square and made of hard materials. Many scales only provide basic information, such as a measurement of a user's weight. The user's weight may be displayed on LED display on the scale that requires the user to bend to read.

Scales may be square with sharp edges and corners. Their top surfaces may be made out of stainless steel or glass, which are hard and cold. Scales with these features may feel static, cold, clinical, and intimidating to step on. Scales may have a display on top, thereby requiring the user to bend to read the display. Scales do not provide an indicator to tell the user when they may step off, which may lead to users struggling to get an accurate reading by trying a few times.

An improved weight scale discussed herein provides feature rich functionality and an improved experience. The improved scale may provide motion detection features, visual and/or audio indicators, trend tracking, or the like.

SUMMARY OF THE INVENTION

In one embodiment, an interactive scale may provide a display, load cells, proximity sensor, light sensor, microcontroller, wireless transceiver, audio indicator(s) and/or visual indicator(s). The features provided by the interactive scale may include, but are not limited to, proximity detection, detection of lighting conditions, wireless data communication, data tracking, visual/audio indicator(s) that aid in utilizing the scale, or the like.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
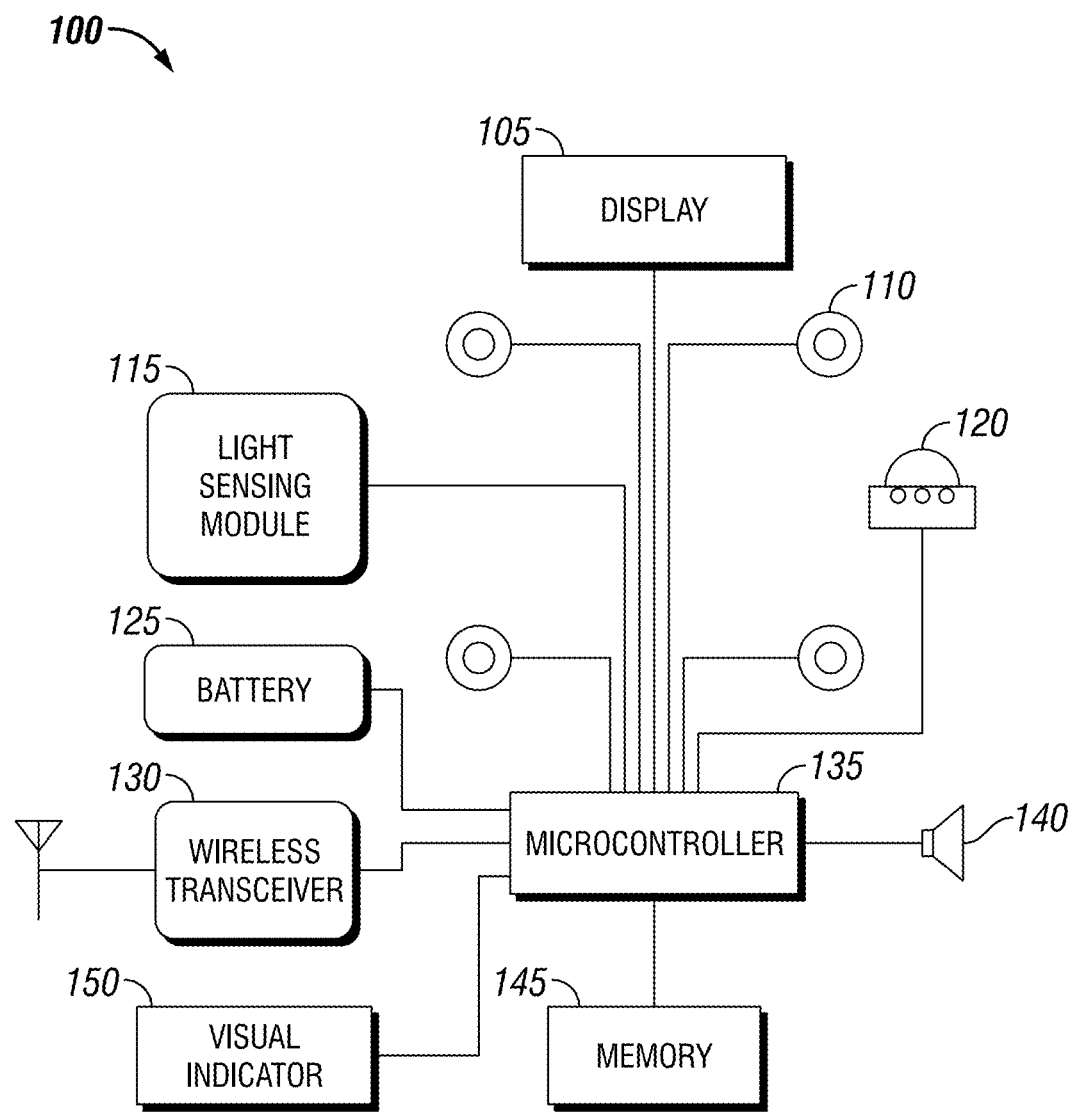
FIG. 1 is an illustrative embodiment of a block diagram of a weight scale.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

An improved weight scale is discussed herein. The scale may provide motion sensing ability. For example, when the scale detects motion within a certain distance, the scale may become active or wakes up. The scale may provide visual indicators, audio indicators, or a combination thereof that guide a user to the scale and through using the scale. For example, visual indicators may illuminate to indicate the location of the scale in dark or low light situations.

In some embodiments, the scale may track and store information on trends or trend data for one or more users. For example, the scale may track a user's weight change over a specified time period. This may provide valuable feedback on how a user's diet, exercise, and/or other factors are affecting their weight. As a nonlimiting example, trend data may include weight, a time stamp, and/or body fat. In some embodiments, the trend tracking information may be utilized to allow the scale to distinguish between multiple users. Further, the scale may provide wireless communication that allows data to be wirelessly transmitted to/received from external devices, such as a computer, smartphone, tablet, PDA, handheld device, or the like. For example, trend tracking data may be sent from the scale to an external device. Further, external devices may be utilized to control the scale, e.g. resetting a scale schedule, setting a scale schedule, deleting old data from the scale, etc.

The scale may provide additional interactive features in addition to motion detection and tracking. The scale may send weigh-in reminders at predetermined time intervals to use the scale to a user's external device so that tracking data can be properly gathered for a predetermined range of time. The weigh-in reminders may provide a message to the user that reminds the user to use the scale at regular intervals. Users may set a target weight loss goal, and the scale may send encouraging messages to external devices at predetermined increments of weight loss. Trend tracking data may be automatically sent to another person, such as a user's medical practitioner, so that changes in weight can be monitored. A user, third party, medical practitioner, and/or the like may set alarms conditions that trigger a loss or gain notice being sent to an external device when a predetermined amount of weight loss or gain occurs.

FIG. 1 is an illustrative embodiment of a block diagram of a weight scale 100. Weight scale 100 may provide a display 110, load cell(s) 110, light sensing module 115, proximity sensor 120, battery 125, wireless transceiver 130, microcontroller or processor 135, audio indicator(s) 140, memory 145, and visual indicator(s) 150. Display 110 provides visual information to a user, such as a measure weight detected by load cells 110. In some embodiments, display 110 may provide additional information related to tracked trends or the like. Display 110 may be a LED display or any other suitable display. Load cells 110 are sensors that measure weight, such as a strain gauge or the like. Light sensing module 115 may detect ambient light in a room. For example, light sensing module 115 may determine whether the lights are on or off in a room that weight scale 100 is place in. Light sensing module 115 may be any suitable photodetector, such as an optical detector, photoresistor, photovoltaic cell, photodiode, or phototransistor. Proximity sensor 120 may detect motion within a predetermined range from weight scale 100. In some embodiments, proximity sensor 120 may be an infrared sensor, ultrasonic sensor, microwave sensor, other motion sensor, or the like. For example, proximity sensor 120 may detect motion 4 feet or closer to weight scale 100. In some embodiments, proximity sensor 120 may be programmed to be active on specific day(s) and/or specific times.

Battery 125 supplies power to the various components of weight scale 100. In other embodiments, any other suitable power source may be substituted for battery 125. Wireless transceiver 130 may transmit or receive data to/from weight scale 100. As a nonlimiting example, wireless transceiver may utilize Bluetooth, WiFi, wireless network, or any other suitable wireless data transmission method. In some embodiments, the scale may track weight, body fat or other trends of a user. The trend data collects information on an associated user, including the user's weight, body fat, time stamp including a date and/or time, and/or the like. For example, each time the scale is used, the data for a user (e.g. measured weight, body fat, or the like) may be stored and saved with a time stamp. Trend data for multiple users may be gathered, tracked, and stored. In some embodiments, the trend data may be automatically associated with a particular user based on the correlation of the new trend data to historical trend data. For example, if weight and body fat of new trend data is within a small percentage of old trend data (e.g. within 1%) stored for a first user, the new trend data may be automatically associated with the first user. In other embodiments, a user may indicate the user records that the new trend data is to be associated with.

In some embodiments, this tracked trend data may be transmitted to a computer, smartphone, PDA, handheld device or the like. By providing wireless data transmission, data may be easily transmitted to a desired device of a user or a third party. Further, the data may be viewed by the user and/or shared with a third party, such as a medical practitioner or nutritionist. Thus, a user's weight, body fat, or other trends can be monitored not only by the user, but also by a third party. Memory 145 may provide software, firmware, and data storage for data gathered by weight scale 100. For example, the abovementioned trend data may be stored in memory 145. Microcontroller 135 serves as a controller for the system that manages operation and control of the various components of weight scale 100. A user may program weight scale 100 to provide weigh-in reminders at a predetermined time interval, such as certain days and/or times, that notify the user to weigh-in, which allows trend data to be consistently gathered on a regular basis. The user or a third part may set weigh-in reminders for a set period of time, such as one or more days, weeks, months, or years.

Audio indicator(s) 140 may provide audio alarms or notices to the user. For example, audio indicator 140 may provide an audio notice to the user when weight has been properly measured, thereby providing an audio indication, such as a melody, chime, or the like, that the user may step off the scale. In some embodiments, properly measured weight requires a weight measured by load cells to be stable for a predetermined period of time. When the weight measure by load cells is stable for the predetermined period of time, the audio indicator 140 may be triggered to provide notice to a user that they can step off the scale. Visual indicator(s) 150 may provide visual alarms or notices to the user. For example, the detection of motion near weight scale 100 may wake up the scale and trigger illumination of visual indicator(s) 150. For example, soft lighting showing footprints and/or a lighted ring may illuminate when motion is detected. In some embodiments, visual indicator(s) 150 may only illuminate when light sensing module 115 detects low light or dark conditions. In some embodiments, the visual indicator(s) 150 may be illuminated when motion is detected within a predetermined distance from the scale by the proximity sensor 120 and light sensing module 115 detects less than a predetermined amount of ambient light. In other embodiments, visual indicator(s) 150 may illuminate in all lighting conditions. In some embodiments, the brightness of visual indicator(s) 150 and/or display 105 may be adjusted in accordance with the brightness detected by light sensing module 115. Visual indicator(s) 150 and/or display 105 may remain illuminated for a predetermined period of time after the user steps off the scale, which would be indicated by a change in weight detected by load cells 110. In some embodiments, the visual indicators may pulsate or breathe in a pattern.

Figure 2:
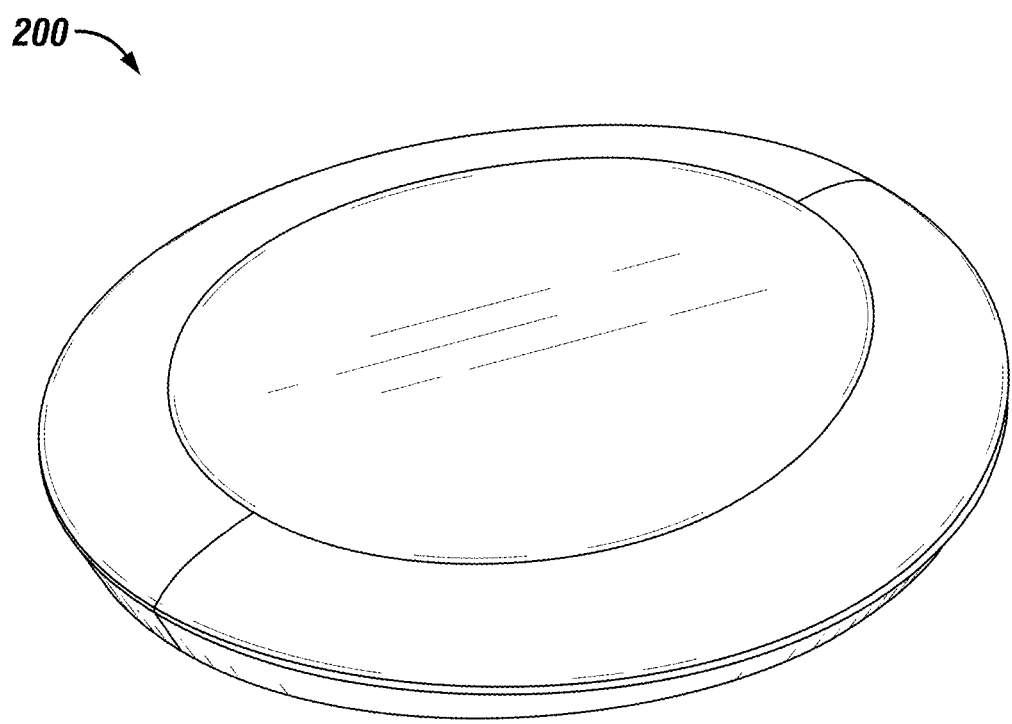
FIG. 2 is an illustrative embodiment of an isometric view of a weight scale.
Figure 3:
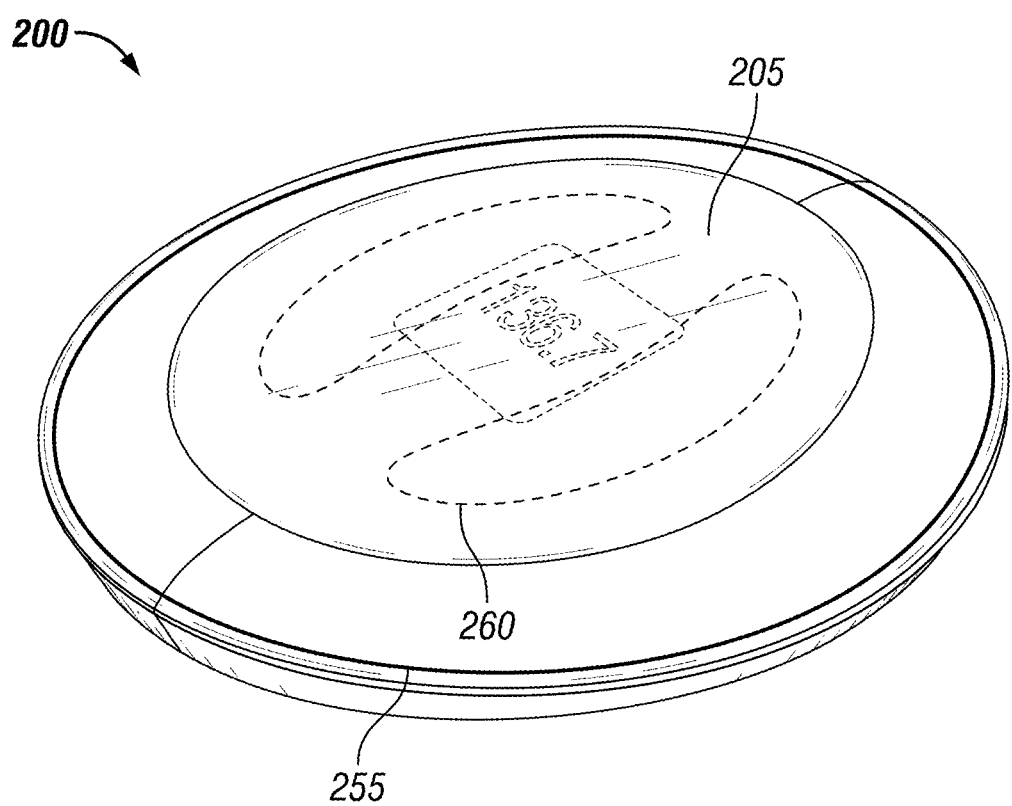
FIG. 3 is an illustrative embodiment showing the display and visual indicators when illuminated and visible through exterior translucent material of weight scale.

FIG. 2 is an illustrative embodiment of an isometric view of a weight scale 200. The exterior of weight scale 200 may be made of translucent material that diffuses light and hides the display and visual indicator(s) when they are not illuminated to enhance the minimal pure aesthetics. As shown, the weight scale may be round, oval, or biomorphic shaped. However, in other embodiments weight scale may be any suitable shape. In some embodiments, the scale may be made of ergonomic materials, such translucent soft silicon with optimized friction, a warm feel, and a matte finish. Since feet are not flat, the top surface of weight scale may be contoured, like a river cobble or the like, so that it feels soft, warm, and comfortable. In some embodiments, the outer rim may be made from soft foam. In some embodiments, a top surface of scale 200 may evenly distribute weight to load cells. FIG. 3 is an illustrative embodiment showing the display 205 and visual indicators 255, 260 when illuminated and visible through exterior translucent material of weight scale 200. As discussed previously, display 205 may display information to a user, such as a measured weight or trend data. A contour indicator 255 may surround the outer periphery of weight scale 200, and may light up when a proximity sensor detects motion near the scale. Further, top indicators 260 may light up to provide a guide to the user that indicates where approximately where the user should stand on the scale. In dark or low light rooms, this allows the user to easily determine where the weight scale 200 is and where to stand on the scale.

The weight scale as described herein provides an interactive experience to a user, and transforms and humanizes the interaction between a user and a scale, thus improve consumer's perception of the product. It transforms a static, cold, clinical, intimidating and anxious experience into a human, warm, simple, elegant and rewarding experience.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A weight scale comprising:
   a microcontroller;
   a display coupled to the microcontroller, wherein the display provides visual information to a user;
   a power source for providing power to components of the weight scale;
   at least one load cell coupled to the microcontroller, wherein the at least one load cell measures weight of the user;
   a proximity sensor coupled to the microcontroller, wherein the proximity sensor detects motion within a predetermined distance from the weight scale; and
   a visual indicator coupled to the microcontroller, wherein the microcontroller is programmed to cause the visual indicator to provide visual notices to the user that guides the user to where to stand on the weight scale by activating when the proximity sensor detects motion, and the visual indicator is selected from illuminated footprints or a lighted ring at an outer periphery of the weight scale.

2. The weight scale of claim 1, further comprising a light sensing module coupled to the microcontroller, wherein the light sensing module detects ambient light and a brightness of the visual indicator is adjusted in accordance with a brightness of the ambient light detected.

3. The weight scale of claim 2, wherein the visual indicator is activated when the proximity sensor detects motion and the light sensing module detects less than a predetermined amount of ambient light.

4. The weight scale of claim 1, further comprising an audio indicator coupled to the microcontroller, wherein the audio indicator provides an audio notice to the user.

5. The weight scale of claim 4, wherein the microcontroller is programmed to determine whether a weight measured by the at least one load cell is stable for a predetermined period of time, and based on the determination, provides an audio notice with an audio indicator when the weight measured is stable.

6. The weight scale of claim 1, further comprising a memory coupled to the microcontroller, wherein the memory stores trend data for the user; and
   a wireless transceiver coupled to the microcontroller, wherein the wireless transceiver is capable of transmitting and receiving data to an external device.

7. The weight scale of claim 6, wherein the wireless transceiver transmits trend data to the external device of a medical practitioner, nutritionist, or a third party.

8. The weight scale of claim 6, wherein the trend data comprises weight, a time stamp, and/or body fat.

9. The weight scale of claim 1, wherein weigh-in reminders are sent to an external device and the weigh-in reminders instruct the user to use the weight scale so that trend data is gathered for a predetermined period of time.

10. The weight scale of claim 1, wherein encouraging messages are sent to an external device at predetermined increments of weight loss.

11. The weight scale of claim 1, wherein a loss or gain notice is sent to an external device when a predetermined amount of weight loss or gain is detected by the weight scale.

12. The weight scale of claim 1, wherein the visual indicator is the illuminated footprints.

13. A method for providing an interactive weight scale, the method comprising:
    providing a weight scale, the weight scale comprising
        a microcontroller;
        a display coupled to the microcontroller, wherein the display provides visual information to a user;
        a power source for providing power to components of the weight scale; and
        at least one load cell coupled to the microcontroller, wherein the at least one load cell measures weight of the user;
    monitoring motion within a predetermined distance from the weight scale with a proximity sensor; and
    guiding the user to where to stand on the weight scale by activating a visual indicator when the proximity sensor detects motion within the predetermined distance from the weight scale.

14. The method of claim 13, further comprising monitoring ambient light with a light sensing module, wherein the visual indicator is activated when the proximity sensor detects motion and the light sensing module detects less than a predetermined amount of ambient light, and a brightness of the visual indicator is adjusted in accordance with a brightness of the ambient light detected.

15. The method of claim 13, further comprising determining whether a weight measured by the at least one load cell is stable for a predetermined period of time, and based on the determination, providing an audio notice with an audio indicator when the weight measured is stable.

16. The method of claim 13, further comprising storing trend data for the user in a memory, wherein the trend data comprises weight, a time stamp, and/or body fat.

17. The method of claim 16, wherein a wireless transceiver transmits trend data to an external device of a medical practitioner, nutritionist, or a third party.

18. The method of claim 13, further comprising sending weigh-in reminder at a predetermined time interval to an external device instructing the user to weigh-in so that trend data is gathered.

19. The method of claim 13, further comprising sending encouraging messages to an external device at predetermined increments of weight loss or sending a loss or gain notice to an external device when a predetermined amount of weight loss or gain is detected by the weight scale.

20. The method of claim 13, wherein the visual indicator is selected from illuminated footprints or a lighted ring at an outer periphery of the weight scale.

21. The method of claim 20, wherein the visual indicator is the illuminated footprints.

\* \* \* \* \*